United States Patent
Mori et al.

(10) Patent No.: US 7,400,576 B2
(45) Date of Patent: Jul. 15, 2008

(54) METHOD AND SYSTEM FOR QOS CONTROL USING WIRELESS LAN NETWORK, ITS BASE STATION, AND TERMINAL

(75) Inventors: Naoki Mori, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 883 days.

(21) Appl. No.: 10/720,095

(22) Filed: Nov. 25, 2003

(65) Prior Publication Data

US 2004/0106403 A1    Jun. 3, 2004

(30) Foreign Application Priority Data

Nov. 26, 2002    (JP)    ............... 2002-342537

(51) Int. Cl.
    *H04L 12/26*    (2006.01)
(52) U.S. Cl. ..................... 370/229; 370/338
(58) Field of Classification Search ............... 370/338, 370/310, 352, 331, 349, 351; 713/202; 726/6
    See application file for complete search history.

(56) References Cited

U.S. PATENT DOCUMENTS

| | | | |
|---|---|---|---|
| 6,654,363 B1 * | 11/2003 | Li et al. ..................... 370/338 |
| 6,697,627 B1 * | 2/2004 | Ueno ..................... 455/452.1 |
| 7,249,374 B1 * | 7/2007 | Lear et al. ..................... 726/6 |
| 2002/0124190 A1 * | 9/2002 | Siegel et al. ............... 713/202 |
| 2002/0188562 A1 * | 12/2002 | Igarashi et al. ............... 705/40 |
| 2003/0185183 A1 * | 10/2003 | Lohtia et al. ............... 370/338 |
| 2003/0214929 A1 * | 11/2003 | Bichot et al. ............... 370/338 |
| 2004/0081109 A1 * | 4/2004 | Oishi ..................... 370/310 |
| 2005/0286489 A1 * | 12/2005 | Shin et al. ..................... 370/352 |

FOREIGN PATENT DOCUMENTS

| | | |
|---|---|---|
| JP | 2000-92123 A | 3/2000 |
| JP | 2000-209267 A | 7/2000 |
| JP | 2002-33764 A | 1/2002 |
| JP | 2002-033764 A | 1/2002 |
| JP | 2002-236632 A | 8/2002 |
| JP | 2002-290480 A | 10/2002 |
| JP | 2002-359881 A | 12/2002 |
| JP | 2003-234770 A | 8/2003 |
| JP | 2003-524333 A | 8/2003 |
| JP | 2003-264878 A | 9/2003 |
| WO | WO 02/23362 A1 | 3/2002 |

* cited by examiner

*Primary Examiner*—Kwang B. Yao
*Assistant Examiner*—Syed Bokhari
(74) *Attorney, Agent, or Firm*—Sughrue Mion, PLLC

(57) ABSTRACT

In the QoS control system of the wireless LAN network including the wireless LAN access points, and the wireless LAN terminals to be connected thereto, the wireless LAN access point authenticates the user on the basis of the recorded user's authentication information when the user carries out the authentication request from the wireless LAN terminal. The wireless LAN access point is connected to the servers to notify the wireless LAN access point of the information for identifying the wireless LAN terminal and the recorded user's QoS service content through the communication network. The wireless LAN access point and the wireless LAN terminal carry out the priority control in accordance with the priority information of the QoS service from the server. Even when the terminal to be used is changed, if the same user logs onto the certificate server by using the same authentication information, the same QoS service can be offered consistently.

7 Claims, 18 Drawing Sheets

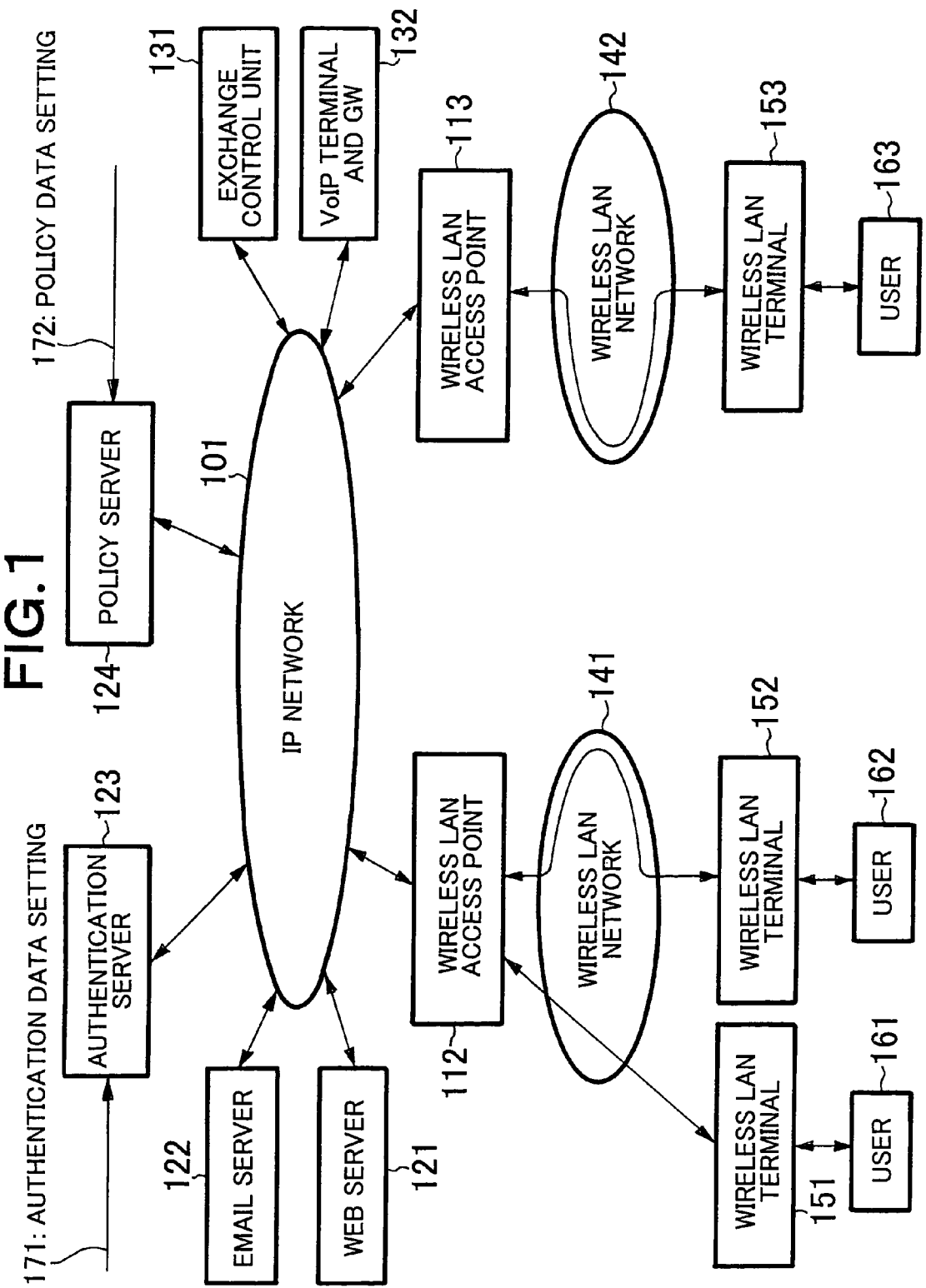

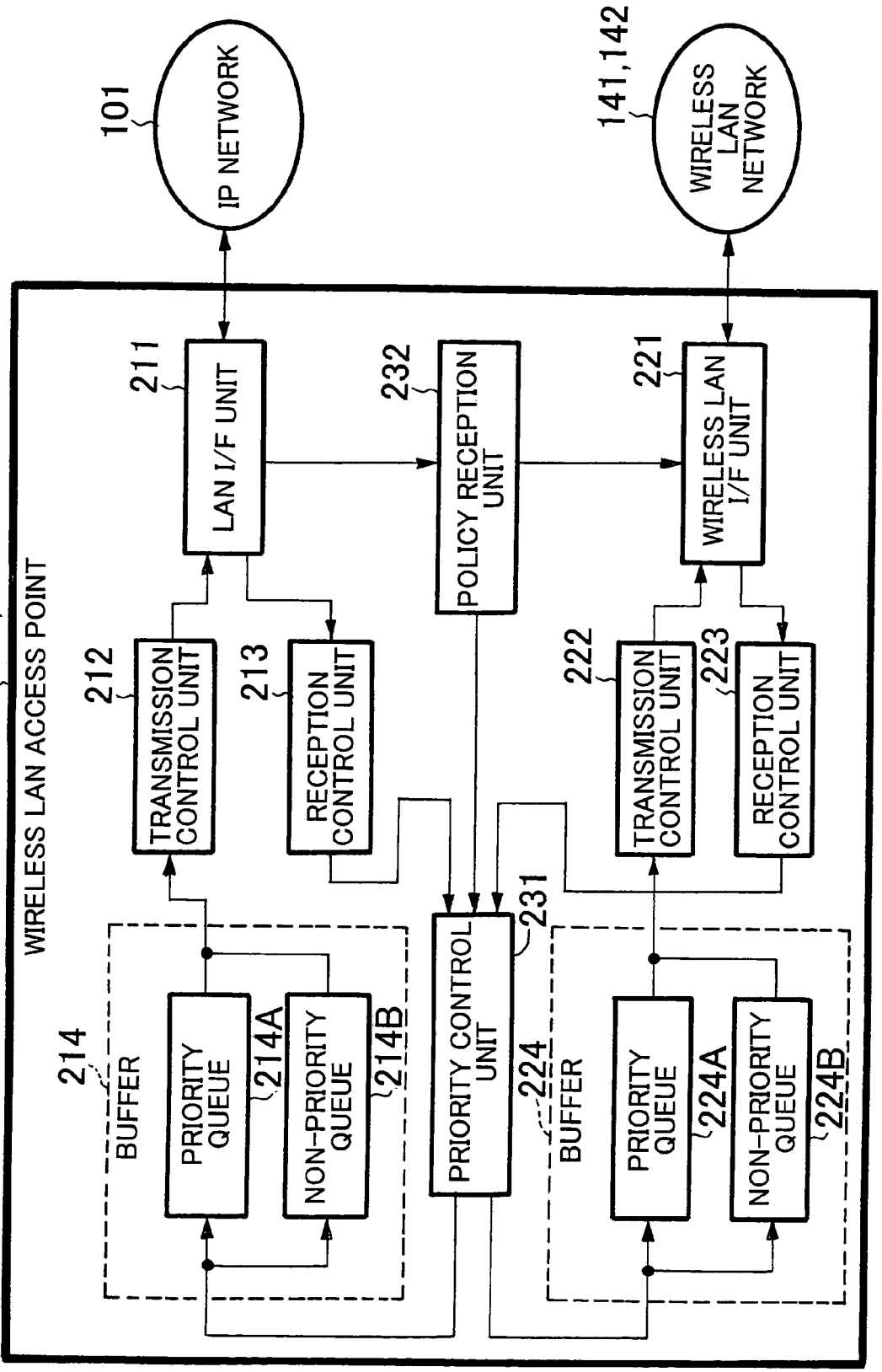

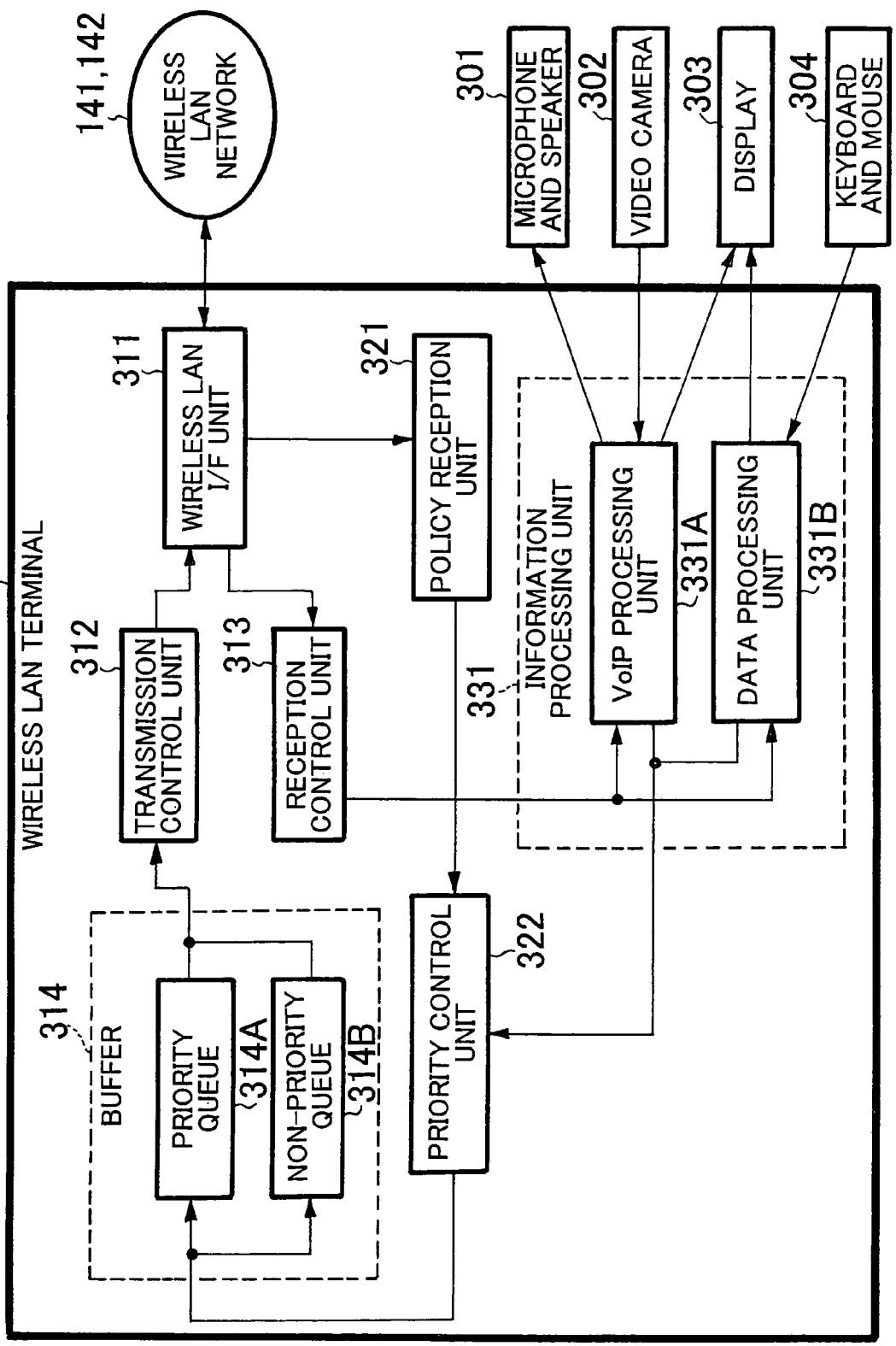

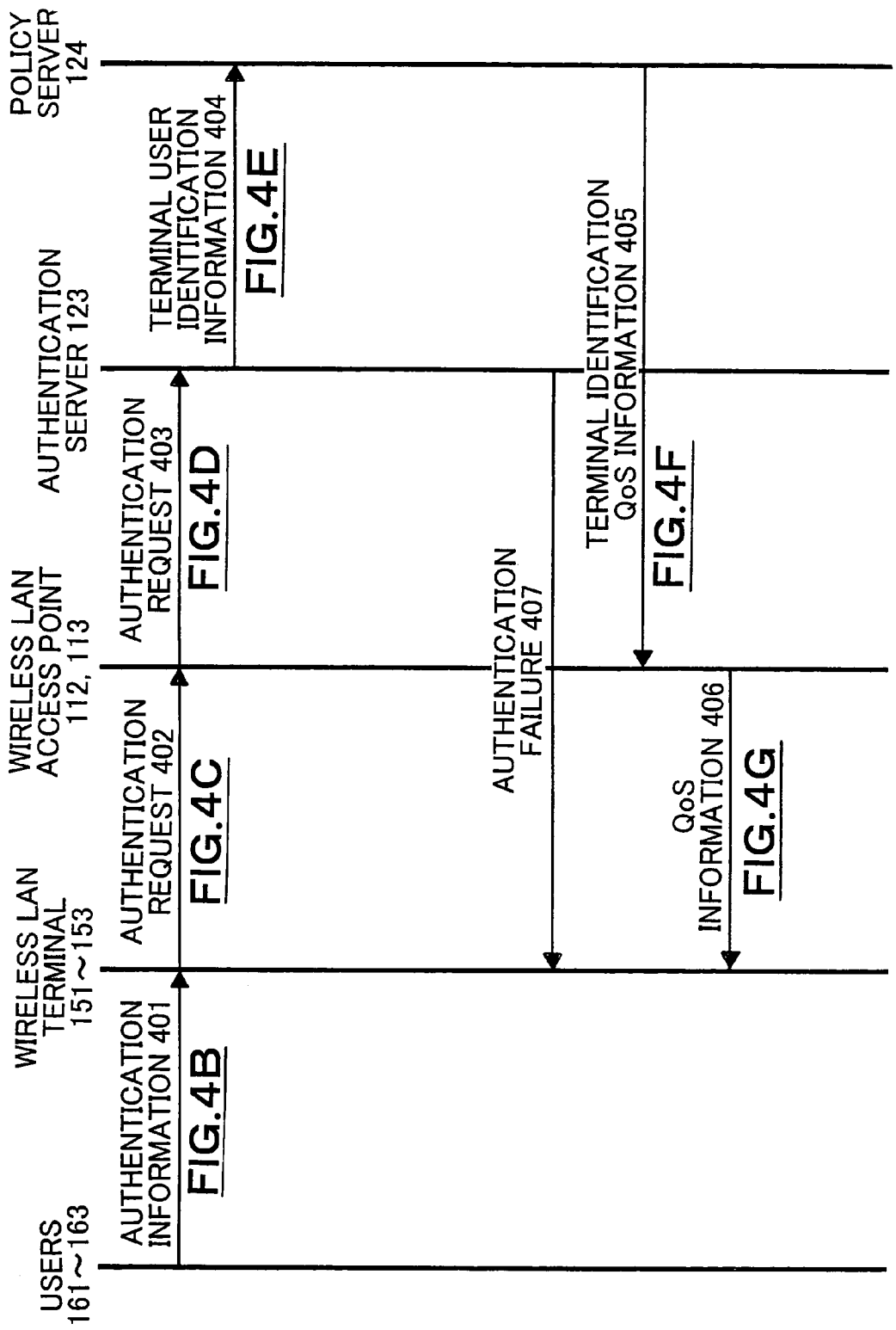

FIG.4B

USER: TARO
PASS WORD: XYZ

FIG.4C

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263
...

FIG.4D

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263 ...
[ACCESS POINT INFORMATION]
IP: 192. 168. 0. 2
MAC: 00-00-00-00-00-01
PRIORITY CONTROL FUNCTION: PROVIDED
PACKET COMPRESSION FUNCTION: PROVIDED
...

FIG.4E

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263 ···
[ACCESS POINT INFORMATION]
IP: 192. 168. 0. 2
MAC: 00-00-00-00-00-01
PRIORITY CONTROL FUNCTION: PROVIDED
PACKET COMPRESSION FUNCTION: PROVIDED
...

FIG.4F

[TERMINAL INFORMATION]
IP: 192. 168. 0.1
MAC: 00-00-00-00-00-00
PRIORITY CONTROL FUNCTION: ALLOWED
PACKET COMPRESSION FUNCTION: ALLOWED
PROTOCOL: H.323, SIP
CODEC: G.711, 729 a, H.263
...

FIG.4G

[TERMINAL INFORMATION]
IP: 192. 168. 0.1
MAC: 00-00-00-00-00-00
PRIORITY CONTROL FUNCTION: ALLOWED
PACKET COMPRESSION FUNCTION: ALLOWED
PROTOCOL: H.323, SIP
CODEC: G.711, 729 a, H.263 ...
[ACCESS POINT INFORMATION]
IP: 192. 168. 0. 2
MAC: 00-00-00-00-00-01
PRIORITY CONTROL FUNCTION: ALLOWED
PACKET COMPRESSION FUNCTION: ALLOWED
...

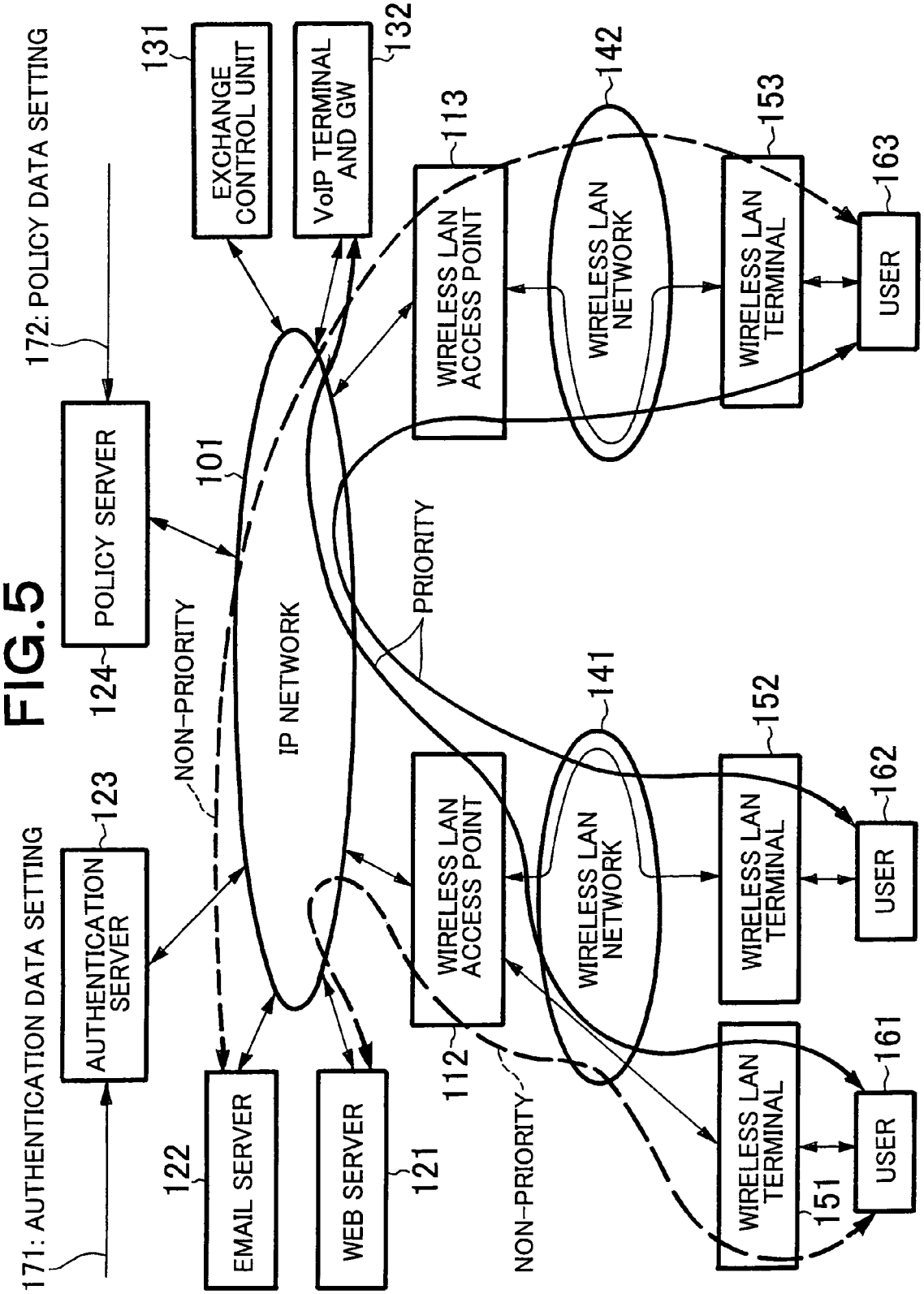

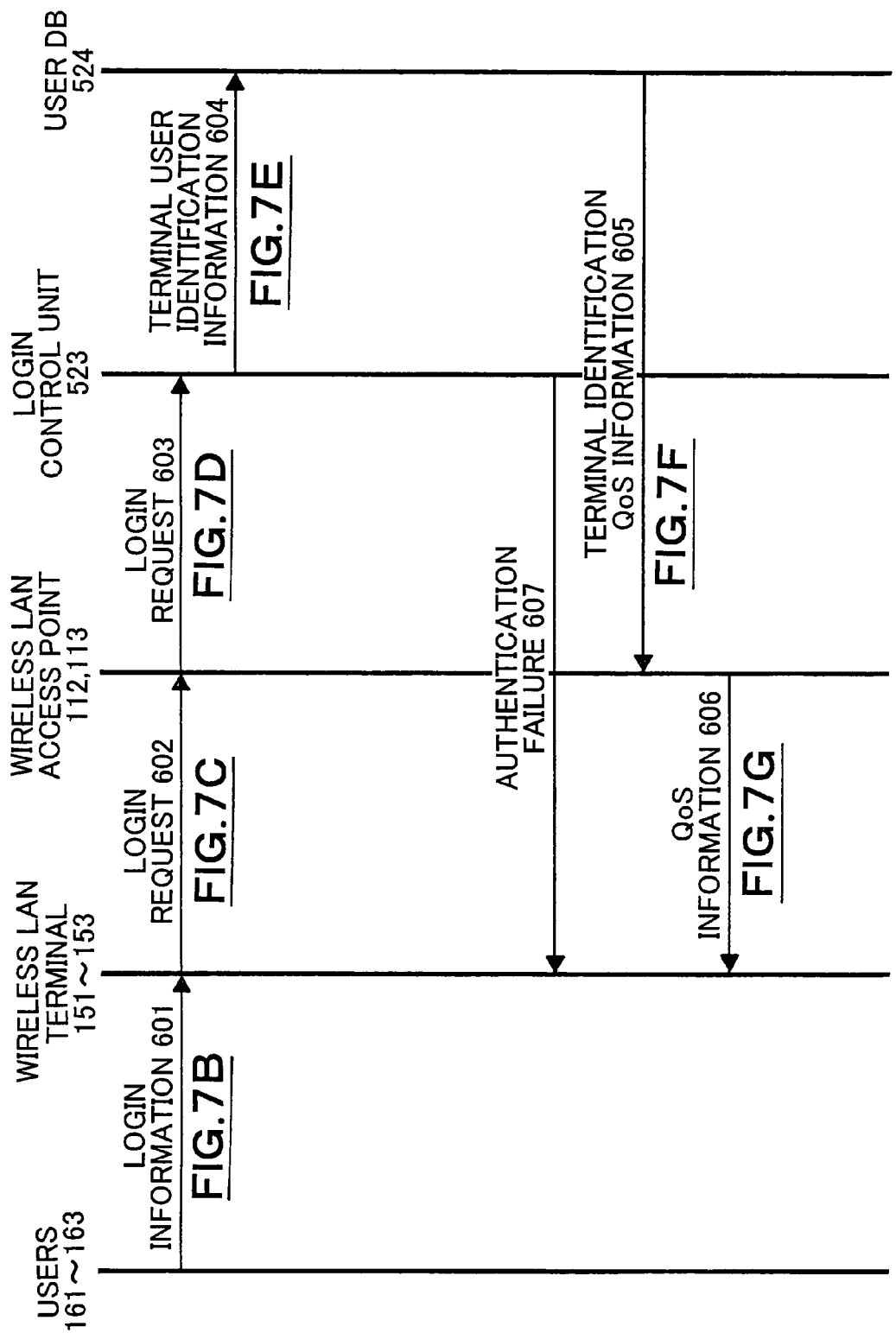

FIG.7B

USER: TARO
PASS WORD: XYZ

FIG.7C

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263
...

FIG.7D

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263 ...
[ACCESS POINT INFORMATION]
IP: 192. 168. 0. 2
MAC: 00-00-00-00-00-01
PRIORITY CONTROL FUNCTION: PROVIDED
PACKET COMPRESSION FUNCTION: PROVIDED
...

FIG.7E

USER: TARO
PASS WORD: XYZ
[TERMINAL INFORMATION]
IP: 192. 168. 0.1
MAC: 00-00-00-00-00-00
PRIORITY CONTROL FUNCTION: PROVIDED
PACKET COMPRESSION FUNCTION: PROVIDED
PROTOCOL: H.323, SIP
CODEC: G.711, 729 a, H.263 ···
[ACCESS POINT INFORMATION]
IP: 192. 168. 0. 2
MAC: 00-00-00-00-00-01
PRIORITY CONTROL FUNCTION: PROVIDED
PACKET COMPRESSION FUNCTION: PROVIDED
...

FIG.7F

[TERMINAL INFORMATION]
IP: 192. 168. 0.1
MAC: 00-00-00-00-00-00
PRIORITY CONTROL FUNCTION: ALLOWED
PACKET COMPRESSION FUNCTION: ALLOWED
PROTOCOL: H.323, SIP
CODEC: G.711, 729 a, H.263
...

FIG.7G

[TERMINAL INFORMATION]
IP: 192. 168. 0.1
MAC: 00-00-00-00-00-00
PRIORITY CONTROL FUNCTION: ALLOWED
PACKET COMPRESSION FUNCTION: ALLOWED
PROTOCOL: H.323, SIP
CODEC: G.711, 729 a, H.263 ...
[ACCESS POINT INFORMATION]
IP: 192. 168. 0. 2
MAC: 00-00-00-00-00-01
PRIORITY CONTROL FUNCTION: ALLOWED
PACKET COMPRESSION FUNCTION: ALLOWED
...

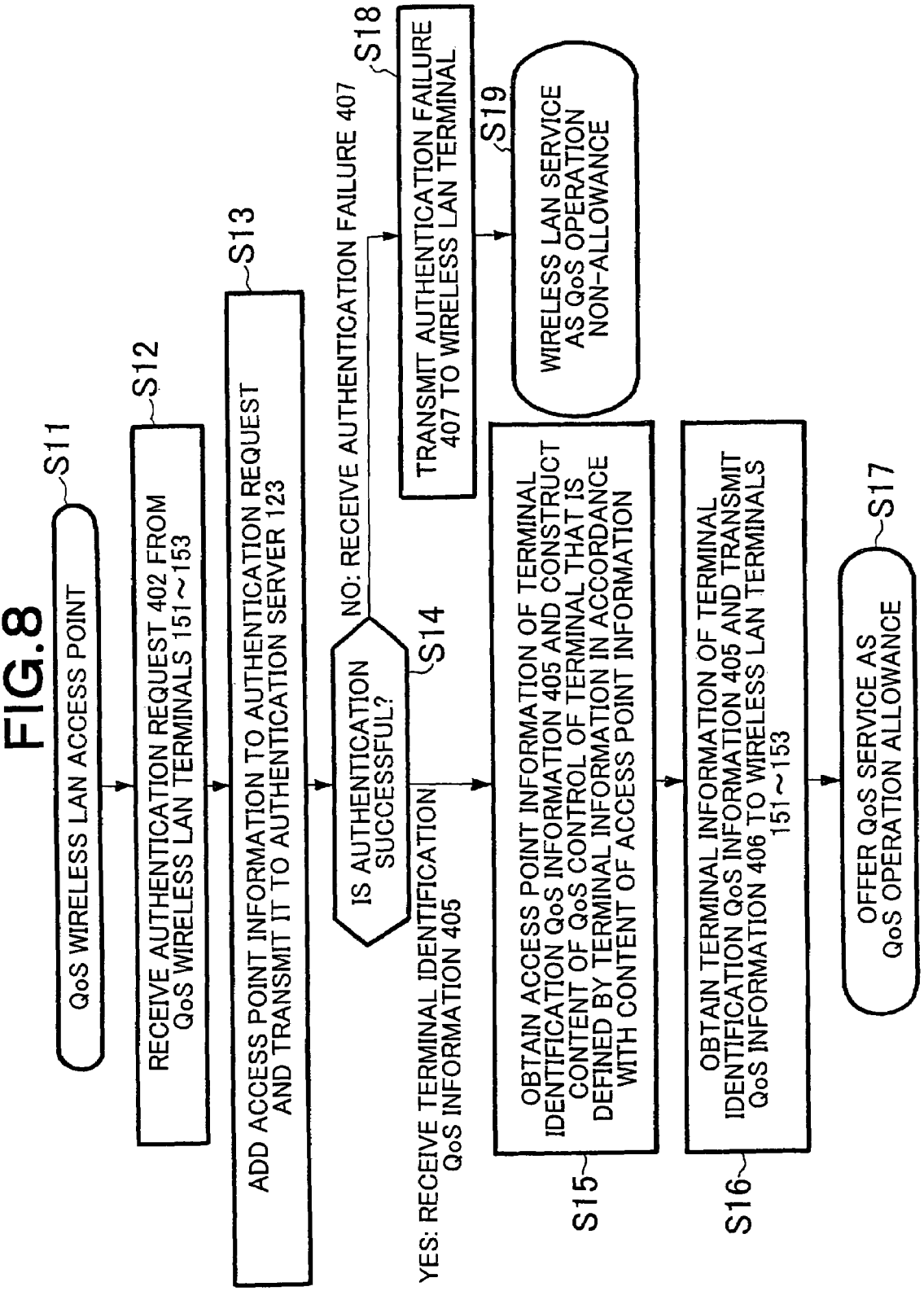

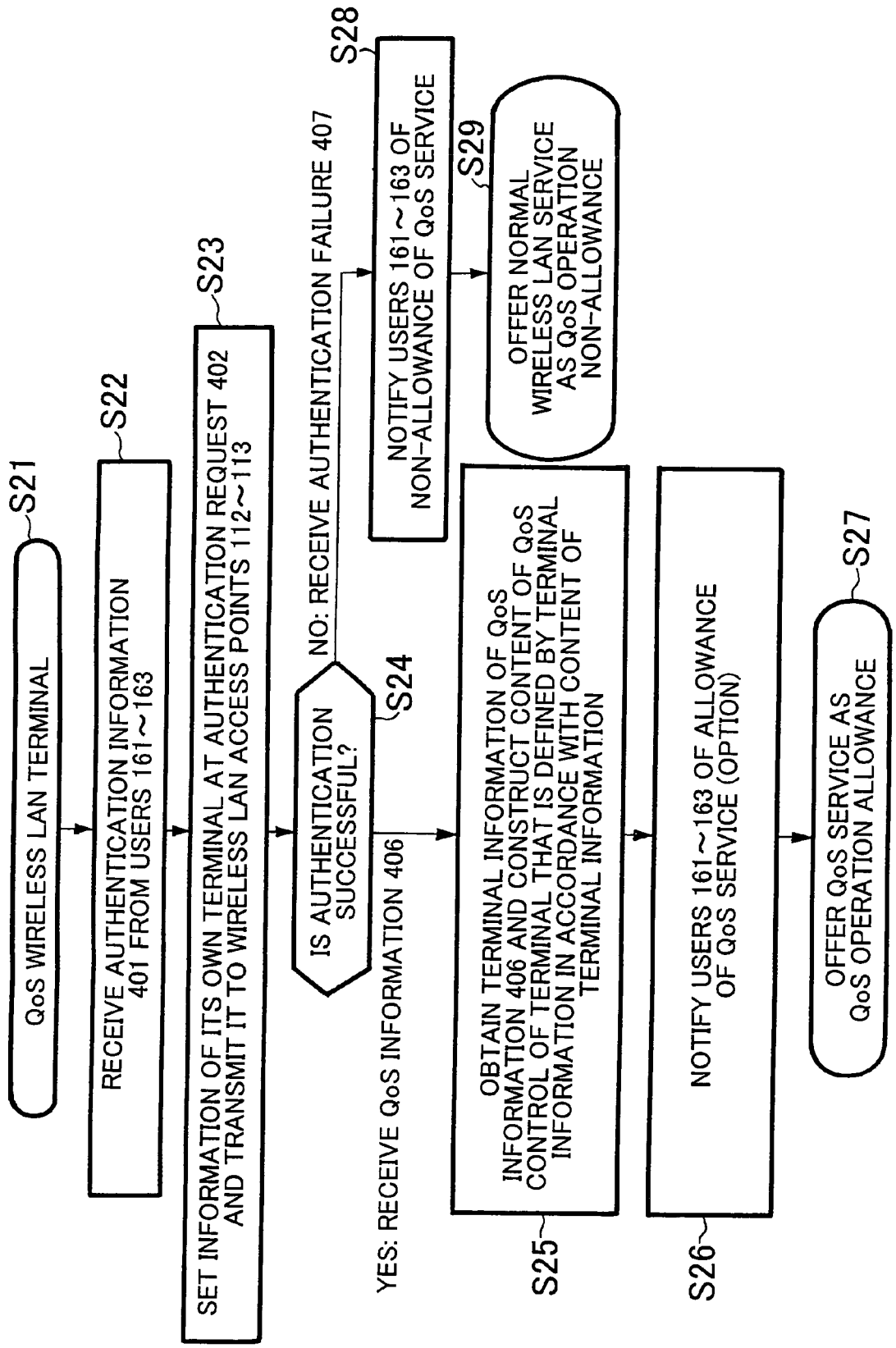

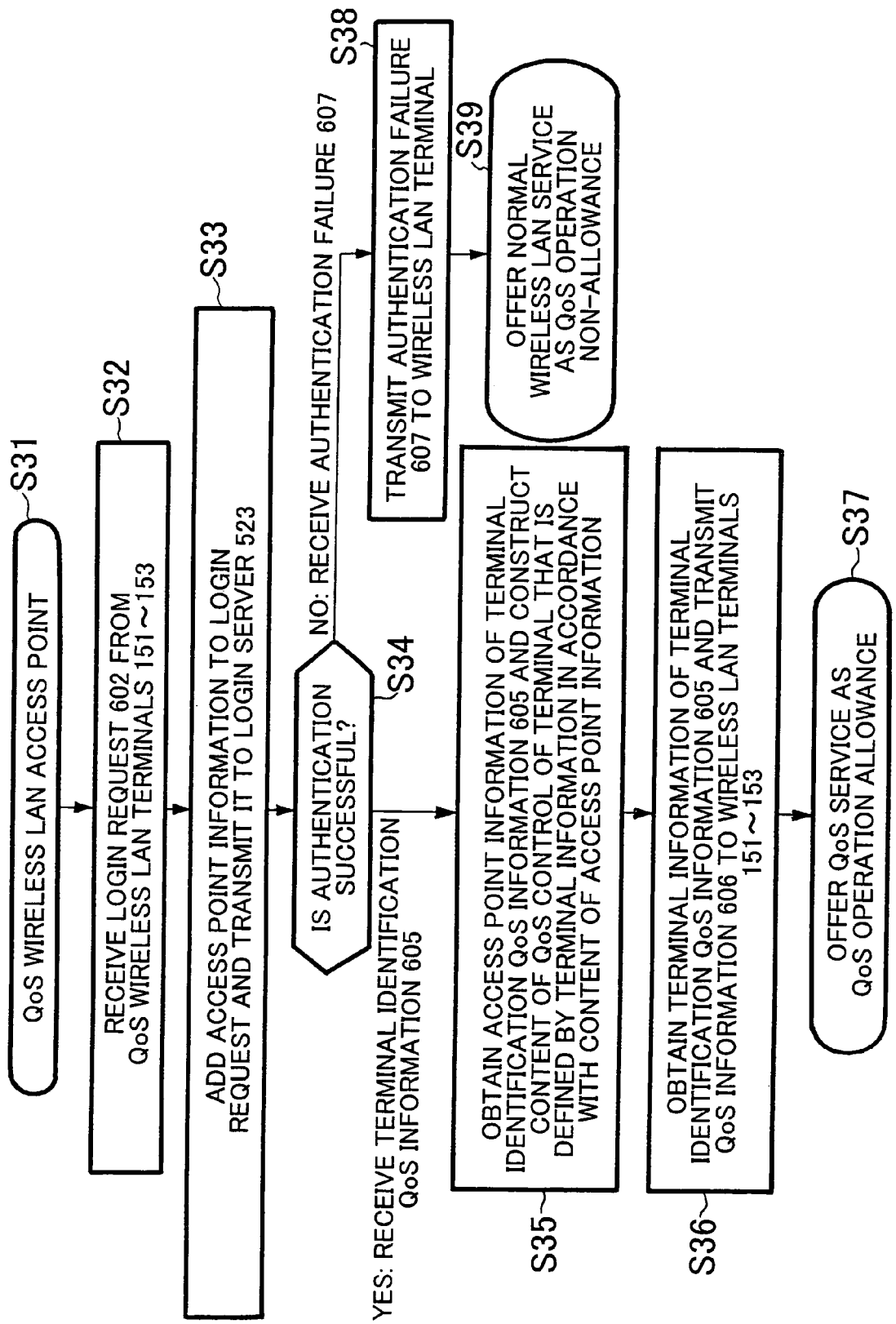

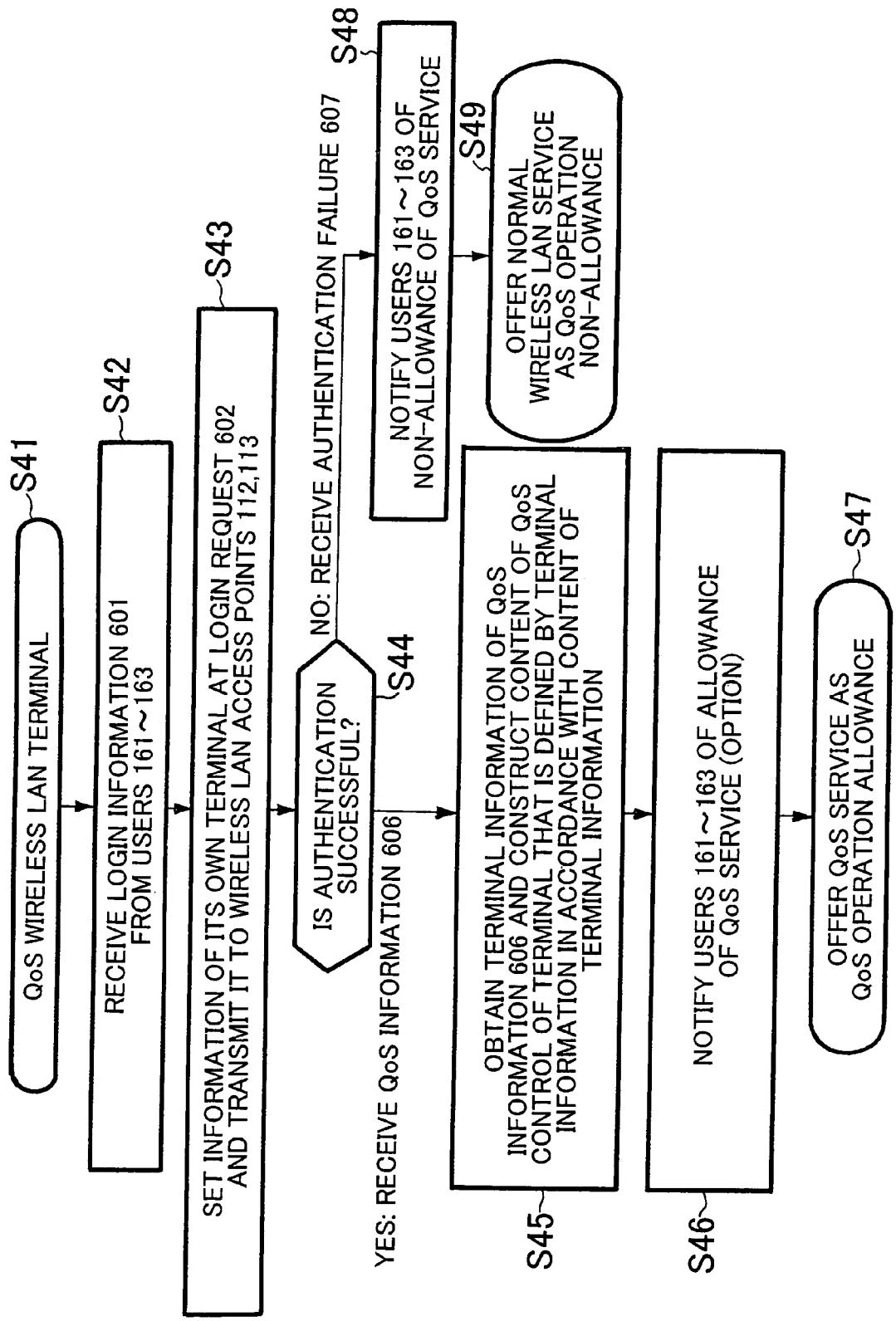

METHOD AND SYSTEM FOR QOS CONTROL USING WIRELESS LAN NETWORK, ITS BASE STATION, AND TERMINAL

BACKGROUND OF THE INVENTION

1. Field of the Invention

The present invention relates to a system for QoS (Quality of Service) control using a wireless LAN (Local Area Network) network, a method of the same, a base station and a terminal for the wireless LAN, and a program for the QoS control of the base station and the terminal.

2. Description of the Related Art

In the wireless LAN network, the base station, for example, a wireless LAN access point or the like, and the terminal, for example, PC (Personal Computer) or the like, communicate data to each other in accordance with a given standard for a wireless LAN, for example, IEEE (Institute of Electrical and Electronics Engineers) 802.11b, IEEE 802.11a, or the like.

A user of the wireless LAN network can get QoS service in accordance with a given QoS control, for example, a priority control of the communicated data, or the like, from the wireless LAN access point. In this case, most of the QoS service is offered for each terminal to be used.

As to the QoS control, JP-A-2000-092123 discloses a technology to offer QoS service for each user. In addition, JP-A-2000-209267 and JP-A-2003-234770 or the like disclose a technology to automatically construct QoS service in collaboration with a policy server.

However, there is a disadvantage that the technology disclosed in JP-A-2000-092123 needs to add the special user information into a packet of communicated data, and then has no versatility. In addition, the technology disclosed in JP-A-2000-209267 and JP-A-2003-234770 has an object of carrying out QoS control within an IP (Internet Protocol) network, and then do not disclose QoS control between the wireless LAN access point and the wireless LAN terminal.

SUMMARY OF THE INVENTION

The present invention has been implemented in view of the foregoing situation, and an object of the present invention is to provide a system for QoS control using a wireless LAN network that even when the terminal to be used is changed, if the same user logs onto the certificate server by using the same authentication information, the same QoS service can be offered consistently.

In order to attain the above objects, according to a first aspect of the present invention, there is provided a QoS control system using a wireless LAN network, comprising: a wireless LAN base station connected to the wireless LAN network; and one or a plurality of wireless LAN terminals connected to the wireless LAN base station via the wireless LAN network, wherein the wireless LAN base station comprises means for receiving information for identifying the wireless LAN terminal and a QoS service content of a user whose authentication is required from a server via a communication network, the server being configured to, when the user of the wireless LAN network requires a user's authentication from the wireless LAN terminal, authenticate the user of the wireless LAN network whose authentication is required based on a recorded user's authentication information and notify the wireless LAN base station of the information and the QoS service content, the QoS service content including a priority information, means for receiving information for identifying the wireless LAN terminal from the wireless LAN terminal via the wireless LAN network, and means for carrying out priority control in accordance with the priority information of the QoS service content from the server, if the information for identifying the wireless LAN terminal from the wireless LAN terminal corresponds to that from the server, and wherein the wireless LAN terminal comprises means for requiring the user's authentication the wireless LAN base station, means for receiving the priority information of the QoS service content notified from the server via the wireless LAN base station, and means for carrying out the priority control in accordance with the priority information.

According to a QoS control system of a second aspect of the present invention, the server comprises: an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station; and a policy server which stores a QoS service content for each user and notifies the wireless LAN base station of the QoS service content corresponding to the user information notified from the authentication server together with the information for identifying the wireless LAN terminal.

According to a QoS control system of a third aspect of the present invention, the authentication server or the policy server is included in an exchanger to accommodate VoIP (Voice over Internet Protocol).

According to a forth aspect of the present invention, there is provided a wireless LAN base station for communicating with a one or a plurality of wireless LAN terminals via a wireless LAN network, the wireless LAN base station comprising: means for receiving information for identifying the wireless LAN terminal and a QoS service content of a user whose authentication is required from a server via a communication network, the server being configured to, when the user of the wireless LAN network requires a user's authentication from the wireless LAN terminal, authenticate the user of the wireless LAN network whose authentication is required based on a recorded user's authentication information and notify the wireless LAN base station of the information and the QoS service content, the QoS service content including a priority information; means for receiving information for identifying the wireless LAN terminal from the wireless LAN terminal via the wireless LAN network; and means for carrying out priority control in accordance with the priority information of the QoS service content from the server, if the information for identifying the wireless LAN terminal from the wireless LAN terminal corresponds to that from the server.

According to a fifth aspect of the present invention, there is provided a wireless LAN terminal for communicating with a wireless LAN base station via a wireless LAN network, the wireless LAN base station comprising: means for requiring a user's authentication to the wireless LAN base station, wherein the wireless LAN base station receives information for identifying the wireless LAN terminal and a QoS service content of a user whose authentication is required from a server via a communication network, the server is configured to authenticate the user of the wireless LAN network whose authentication is required based on a recorded user's authentication information and notify the wireless LAN base station of the information and the QoS service content, and the QoS service content includes a priority information; means for receiving the priority information of the QoS service content notified from the server via the wireless LAN base station; and means for carrying out the priority control in accordance with the priority information, if the information for identifying the wireless LAN terminal from the server is correct.

According to a sixth aspect of the present invention, there is provided a QoS control method of a wireless LAN network including a wireless LAN base station and one or a plurality of wireless LAN terminals to be connected to the wireless LAN base station, the QoS control method comprising the steps of: performing a first step by a server connected to the wireless LAN base station via the wireless LAN network, comprising the steps of authenticating a user of the wireless LAN network whose authentication is required based on a recorded user's authentication information, when the user of the wireless LAN network requires a user's authentication from the wireless LAN terminal, and notifying the wireless LAN base station of information for identifying the wireless LAN terminal and a QoS service content of a user whose authentication is required from a server via a communication network, the QoS service content including a priority information; performing a second step by the wireless LAN base station comprising the steps of receiving the information for identifying the wireless LAN terminal and the QoS service content of a user whose authentication is required from the server via the communication network, receiving information for identifying the wireless LAN terminal from the wireless LAN terminal via the wireless LAN network, and carrying out priority control in accordance with the priority information of the QoS service content from the server, if the information for identifying the wireless LAN terminal from the wireless LAN terminal corresponds to that from the server; and performing a third step by the wireless LAN terminal comprising the steps of requiring a user's authentication the wireless LAN base station, receiving the priority information of the QoS service content notified from the server via the wireless LAN base station, and carrying out the priority control in accordance with the priority information.

According to a seventh aspect of the present invention, there is provided a QoS control program for enabling a computer of wireless LAN base station to execute a QoS control method of a wireless LAN network, the wireless LAN network including the wireless LAN base station and one or a plurality of wireless LAN terminals to be connected to the wireless LAN base station, the QoS control method comprising the steps of: receiving authentication request from the wireless LAN terminal; adding the received authentication request to information with respect to the wireless LAN base station; transmitting the added authentication request to a server, wherein the server connected to the wireless LAN base station via the wireless LAN network, the server is configured to authenticate a user of the wireless LAN network whose authentication is required based on a recorded user's authentication information and to notify the wireless LAN base station of information for identifying the wireless LAN terminal and a QoS service content of a user whose authentication is required from a server via a communication network, and the QoS service content includes a priority information; if the server does not authenticate the user whose authentication is requested, transmitting the information indicating that the server fails to authenticate the user, to the wireless LAN terminal; and if the server authenticates the user whose authentication is requested, carrying out priority control with respect to the wireless LAN terminal defined by the information for identifying the wireless LAN terminal from the server in accordance with the priority information of the QoS service from the server from the server.

According to a eighth aspect of the present invention, there is provided a QoS control program for enabling a computer of wireless LAN terminal to execute a QoS control method of a wireless LAN network, the wireless LAN network including a wireless LAN base station and the wireless LAN terminal to be connected to the wireless LAN base station, the QoS control method comprising the steps of: requiring a user's authentication to the wireless LAN base station, wherein the wireless LAN base station receives information for identifying the wireless LAN terminal and a QoS service content of a user whose authentication is required from a server via a communication network, the server is configured to authenticate the user of the wireless LAN network whose authentication is required based on a recorded user's authentication information and notify the wireless LAN base station of the information and the QoS service content, and the QoS service content includes a priority information; receiving the priority information of the QoS service content notified from the server via the wireless LAN base station; and carrying out the priority control in accordance with the priority information, if the server authenticates the user whose authentication is requested.

According to the present invention, when a user operating a terminal that is connected to a wireless LAN logs onto a certificate server, it is possible to offer the QoS service that has been determined in advance for each user to a wireless LAN packet of the terminal. Thereby, even when the terminal to be used is changed, if the same user logs onto the certificate server, the same QoS service can be offered consistently.

BRIEF DESCRIPTION OF THE DRAWINGS

In the accompanying drawings:

FIG. 1 is a block diagram showing an embodiment of a wireless LAN network QoS control system according to the present invention;

FIG. 2 is a block diagram showing a constitutional example of the wireless LAN access points shown in FIG. 1;

FIG. 3 is a block diagram showing a constitutional example of the wireless LAN terminals shown in FIG. 1;

FIGS. 4A to 4G are a sequence diagram showing the operation of the wireless LAN network QoS control system shown in FIG. 1;

FIG. 5 is a block diagram showing the operation of the wireless LAN network QoS control system shown in FIG. 1;

FIGS. 7A to 7G are sequence diagram showing the operation of the wireless LAN network QoS control system shown in FIG. 6;

FIG. 8 is a flow chart showing the operation of the wireless LAN access point;

FIG. 9 is a flow chart showing the operation of the wireless LAN terminal;

FIG. 10 is a flow chart showing the operation of the wireless LAN access point;

FIG. 11 is a flow chart showing the operation of the wireless LAN terminal; and

DESCRIPTION OF THE PREFERRED EMBODIMENTS

Figure 6:
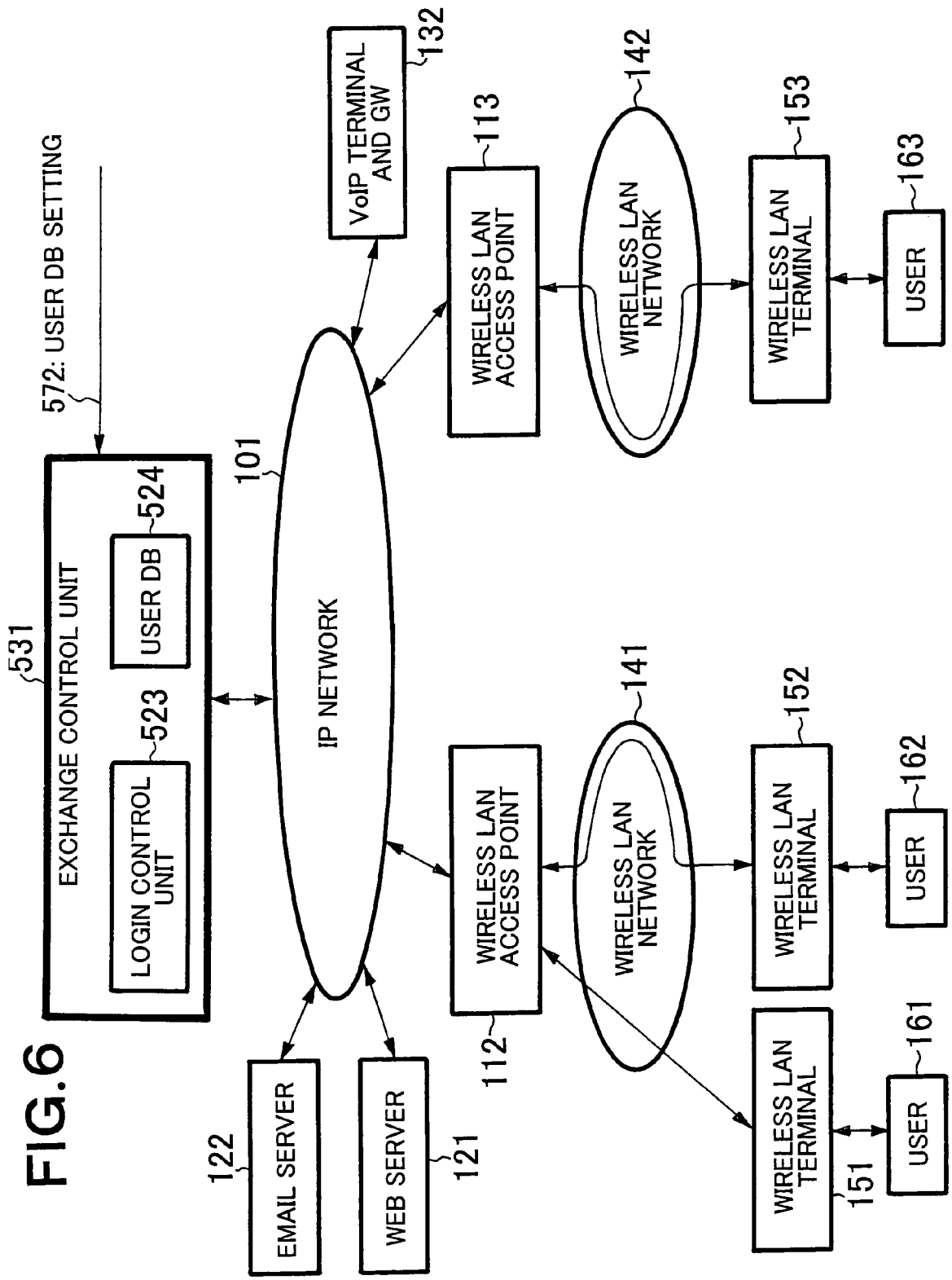
FIG. 6 is a block diagram showing the other embodiment of the wireless LAN network QoS control system according to the present invention.

The embodiments according to the present invention will be described in detail below with reference to the accompanying drawings.

FIG. 1 is a block diagram showing an embodiment of a wireless LAN network QoS control system according to the present invention.

In FIG. 1, a reference numeral 101 denotes an IP (Internet Protocol) network, which means a network of an IP packet such as a LAN (Local Area Network), a WAN (Wide Area Network) and Internet or the like. Reference numerals 112 and 113 denote a wireless LAN access point (wireless LAN base stations, hereinafter referred to as the "access point") to be connected to the IP network, and reference numerals 141 and 142 denote a wireless LAN network to be offered by the access points 112 and 113. The access points 112 and 113 also function as a bridge of the IP packet between a QoS (Quality of Service) function in the wireless LAN network 112, 113 and the IP network 101.

A Web server 121 offers a Web service to users 161 to 163 of wireless LAN terminals (hereinafter referred to as the "terminals") 151 to 153 through the IP network 101 and the wireless LAN networks 141 and 142. An Email (Electronic mail) server 122 offers a mailing service to the users 161 to 163 of the terminals 151 to 153 through the IP network 101 and the wireless LAN networks 141 and 142.

A certificate server 123 stores the authentication information for each of the users 161 to 163 and then, if the users 161 to 163 carries out an authentication request from the terminals 151 to 153, the certificate server 123 will notify a policy server 124 of the terminal user identification information including the identification information capable of identifying the terminal such as an IP address and a MAC address or the like and the user information.

The policy server 124 stores the QoS service content for carrying out priority control for each user and notifies the access points 112 and 113 of the QoS service content corresponding to the user of the notified terminal user identification information as the terminal identification QoS information including the information capable of identifying the terminal and the QoS service content.

An exchange control unit 131 offers a telephone call function by a voice and a video to the terminals 151 to 153 through the IP network 101, and the wireless LAN networks 141 and 142. Further, if the terminals 151 to 153 can directly communicate with each other, the exchange control unit 131 may not be always required.

A VoIP (Voice over Internet Protocol) terminal and GW (Gate Way) unit 132 offers a VoIP client of each terminal and a gate way function to the public network (not illustrated).

The terminals 151 to 153 to be contained in the wireless LAN networks 141 and 142 have voice and video call functions by a Web access, a client function of Email and VoIP.

FIG. 2 shows a constitutional example of the access points 112 and 113 shown in FIG. 1.

Upper LAN I/F (interface) unit 211, a transmission control unit 212, a reception control unit 213, and a buffer 214 form a control unit at the IP network side, and lower wireless LAN I/F unit 221, a transmission control unit 222, a reception control unit 223, and a buffer 224 form a control unit at the wireless LAN side.

The LAN I/F unit 211 exchanges a media with the IP network 201. The transmission control unit 212 and the reception control unit 213 carries out the packet transmission and reception control. In the same way, the wireless LAN I/F unit 221 exchanges a media with the wireless LAN network, and the transmission control unit 222 and the reception control unit 223 carry out the packet transmission and reception control.

The buffer 214 serves as a buffer to temporarily accumulate a packet to be transmitted to the IP network 101, and it has a priority queue 214A and a non-priority queue 214B. The buffer 224 serves as a buffer to temporarily accumulate a packet to be transmitted to the wireless LAN network 141 or 142, and it has a priority queue 224A and a non-priority queue 224B, respectively.

On the basis of an address set in the packet, a priority control unit 231 sorts the packets that are received by the reception control units 213 and 223 into the buffer 214 for the IP network or the buffer 224 for the wireless LAN network. In this case, on the basis of a policy from a policy reception unit 232, the priority control unit 231 decides a priority of each packet and sort the packets into the priority queue 214A or 224A or the non-priority queue 214B or 224B.

The policy reception unit 232 instructs the policy from the policy server 124 to the priority control unit 231 and at the same time, distributes the policy to the terminals 151 to 153 through the wireless LAN I/F 221.

FIG. 3 shows a constitutional example of the wireless LAN terminals 151 to 153 shown in FIG. 1.

A wireless LAN I/F 311 exchanges a media with the wireless LAN network 141 or 142, and a transmission control unit 312 and a reception control unit 313 carry out the transmission and reception control of the packet.

A buffer 314 serves as a server to temporarily accumulate a packet to be transmitted to the wireless LAN network 141 or 142, and it has a priority queue 314A and a non-priority queue 314B, respectively.

On the basis of a policy from a policy reception unit 321, a priority control unit 322 decides a priority of each packet and sort the packets that are created by an information processing unit 331 into the priority queue or the non-priority queue.

A policy receiving unit 321 instructs the policy from the policy server 124 to the priority control unit 322.

The information processing unit 331 is composed of a VoIP processing unit 331A and a data processing unit 331B. The VoIP processing unit 331A controls the call by the voice and the video by using a microphone and speaker 301, a video camera 302, and a display 303. The data processing unit 331B offers the data system service such as an Email client service and a Web browsing service or the like on the basis of the operation by the user by using the display 303 and a keyboard and mouse 304.

Explanation of the Operation

The operation of the wireless LAN network QoS system constructed as described above will be described by using the flow charts shown in FIGS. 4A to 4G, FIG. 8 and FIG. 9 below.

In the wireless LAN network QoS system described with reference to FIGS. 1 to 3, before the users 161 to 163 receive the QoS service by using the terminals 151 to 153, the terminals 151 to 153 is activated (step S21). Then, the activated terminals 151 to 153 add the information of their own terminals to the authentication information 401 which is stored in the terminals 151 to 153 in advance or inputted by using the keyboard and mouse 304 of the terminals 151 to 153 (step S22) and transmit their information to the access points 112 and 113 as authentication request 402 (step S23). Then, the activated access points 112 and 113 receive the authentication request 402 (step S11, step S12) and further, by adding the access point information thereto and transmitting it to the certificate server 123 as the authentication request 403 (step S13), the activated access points 112 and 113 requests the start of the QoS service.

If the users 161 to 163 inputs the authentication information 401 with every using the terminal, even when using the terminal that is different from one that the user ordinarily uses (for example, even when the user 161 uses the terminal 152 or 153), the same content is always transmitted because this user gets to always use the same authentication information 401 and the same user uses the authentication information 402 and 403.

The certificate server 123 receives the authentication information 403 from the terminals 151 to 153 through the access points 112 to 113, and then, if the authentication is possible, the certificate server 123 notifies the policy server 124 of terminal user identification information 404 including the identification information such as the MAC address and the IP address capable of identifying this terminals or the like and the user information.

The policy server 124 notifies the access points 112 and 113 of the QoS service content corresponding to the user of the notified terminal user identification information 404 as the terminal identification QoS information 405 including the information capable of identifying the terminal and the QoS service content.

On the other hand, the certificate server 123 notifies the access points 112 and 113 of authentication failure 407 when the authentication is not possible.

The access points 112 and 113 receive the terminal identification QoS information 405 or the authentication failure 407 at the policy reception unit 232 (step S14). Then, when receiving the terminal identification QoS information 405, the access points 112 and 113 store the terminal identification information and the QoS service content in a pair and instructs the priority control unit 231 to control. Then, the access points 112 and 113 obtain the access point information of the terminal identification QoS information 405 at the policy reception unit 232 and perform the QoS control of the terminal that is defined by the terminal information in accordance with the content of the access point (steps S15 and S17). In the case of receiving the authentication failure 407, the access points 112 and 113 transmit the authentication failure 407 to the terminals through the wireless LAN I/F 221 (step S18), and then, they offer a normal LAN service because the QoS operation is not allowed (step S19).

In addition, the access points 112 and 113 transmit the QoS information 406 to the wireless LAN terminal corresponding to the terminal identification information through the wireless LAN I/F 221 (step S16).

The terminals 151 to 153 receive the terminal identification QoS information 406 or the authentication failure 407 from the access points 112 and 113 by the policy reception unit 321 (step S24). Then, when receiving the terminal identification QoS information 405, the terminals 151 to 153 store the QoS service content and instruct the priority control unit 322 to control. Then, the access points 151 to 153 obtain the terminal information of the QoS information 406 at the policy reception unit 231 and perform the QoS control of the terminal that is defined by the terminal information in accordance with the content of the terminal information (steps S25 to S27). In the case of receiving the authentication failure 407, the access points 151 to 153 notifies the user that the QoS service is not allowed (step S28), and then, they offer a normal LAN service because the QoS operation is not allowed (step S29).

Thus, the authentication operation of the QoS service according to the wireless LAN is completed. In the next place, the actual QoS operation will be further described with reference to FIGS. 4A to 4G.

The users 161 to 163 input the authentication information 401 including a user name and pass word information (for example, the user is Taro and the pass word is XYZ) in the terminals 151 to 153.

The terminals 151 to 153 add the information with respect to the presence of a priority function to offer the IP address, the MAC address and the QoS of the wireless LAN terminal, and a packet compression function to effectively transmit the packet by means of a multicast or the like by compressing or packing the packet and the information of the terminal such as a protocol requiring the QoS and a CODEC or the like to the authentication information 401 and they transmit this to the access points 112 and 113 as the authentication request 402.

The access points 112 and 113 add the information with respect to the presence of the IP address, the MAC address of the wireless access point, the priority control and the QoS function such as the packet compression or the like to the authentication request 402 and they transmit this to the certificate server 123 as the authentication request 403. Further, the policy reception unit 232 of the access points 112 and 113 has a recording unit and the terminal information such as the IP address and the MAC address of the terminal of the authentication request 402 is recorded therein. The access points 112 and 113 judge whether or not these terminal information correspond with each other when they receive the terminal identification QoS information 405 from the policy server, and then if they correspond with each other, they perform the priority control.

According to the user of the authentication request 403 and the pass word or the like, the certificate server 123 determines whether or not this user is qualified to get the QoS service, and then, if this user is qualified, the certificate server 123 transmits the content of the received authentication request 403 to the policy serer 124 as terminal user authentication request information 404 to require the distribution of the policy to the access points 112 and 113, and the terminals 151 to 153. In addition, if the certificate server 123 determines that this user is not qualified to get the QoS service, the certificate server 123 transmits the authentication failure 407 to the terminals 151 to 153 via the access points 112 and 113 and informs that the QoS service of the wireless LAN cannot be enjoyed by means of a display or the like. At the same time, the certificate server 123 constructs the policy reception units 232 and 321 so as not to offer the QoS service to the wireless LAN terminals 151 to 153, and the wireless LAN access points 112 and 113.

When the user is qualified to get the QoS service, the policy server 124, on the basis of the set content of the policy data base, transmits the information of allowance or non-allowance for each of the priority control and the packet compression function or the like in the QoS service and the sorts of the protocols (for example, H. 323, SIP) and the sorts of CODEC (for example, G. 711, G. 729a, H. 263) to allow the QoS service as the terminal identification QoS information 405. Receiving this, the access point constructs the policy reception unit 232 so as to able to apply the QoS service, and transfers the QoS information 406 to the wireless LAN terminal.

Receiving this, the wireless LAN terminals 151 to 153 constructs the policy reception unit 321 so as to able to apply the QoS service. In addition, they can also notify the users 161 to 163 that the user can get the QoS service by means of a display or the like. Further, the policy reception unit 321 of the terminals 151 to 153 have a recording unit and the terminal information such as the IP address and the MAC address or the like of each terminal is recorded in the recording unit. When receiving the terminal identification QoS information 406 from the policy server, they judge whether or not these terminal information correspond with each other, and if they correspond with each other, they carry out the priority control (in other words, they judge whether or not the terminal information such as the IP address and the MAC address or the like of each terminal included in the terminal identification QoS information 406 is correct, and then, if the terminal information is correct, they carry out the priority control). Further, this judgment may not be always done when the wireless LAN base station has already judged whether or not the terminal information correspond with each other.

When the above-described authentication operation is completed, as shown in FIG. 5, the communication of VoIP by H. 323 among the users 161, 162 and 163 and the communication of VoIp by SIP or the like between the user 161 and a VoIP terminal and GW (gate way) 132 apply the priority service and the packet compression service because they correspond to the terminal information that the QoS service is allowed by the policy server 124 when a protocol such as H. 323 and SIP or the like or the information of CODEC is checked by the wireless LAN access points 112 and 113.

In addition, since the communication through the Email server 122 from the user 163 is generally the protocol such as SMTP or POP, the QoS service from the policy server 124 is not allowed, and this results in non-priority (represented by a heavy line in FIG. 5).

In the same way, since the Web browsing service from the user 161 to the Web server 121 is also generally the protocol of HTTP, the QoS service from the policy server 124 is not allowed, and this results in non-priority (represented by a heavy line in FIG. 5).

Other Embodiment

FIG. 6 is a block diagram showing the other embodiment of the wireless LAN network QoS control system according to the present invention. In FIG. 6, the same constitutional parts as those in FIG. 1 are given the same reference numerals.

According to the present embodiment, the control of the certificate server 123 according to the embodiment shown in FIG. 1 is carried out alternatively by a terminal that is equipped to a general exchanger to accommodate VoIP (Voice over Internet Protocol) or a login control unit 523 of the user, and the control of the policy server 124 is carried out alternatively by a user DB (data base) 524 that is equipped to the exchanger. The other configurations are equal to those shown in FIG. 1.

In the next place, the operational example of the wireless LAN network QoS shown in FIG. 6 will be described with reference to FIGS. 7A to 7G, 10 and 11 below.

The operation of the wireless LAN network QoS shown in FIG. 6 is also equal to the operation according to the embodiment shown in FIGS. 4A to 4G, 8 and 9. In the present embodiment, login information 601, a login request 602, a login request 603, terminal user identification information 604, terminal identification QoS information 605, QoS information 606, and authentication failure 607 correspond to the authentication information 401, the authentication request 402, the authentication request 403, the terminal user identification information 404, terminal identification QoS information 405, QoS information 406, and authentication failure 407, respectively, and the information content and the request content are the same. In FIGS. 10 and 11, steps S31 to S39, and steps S41 to S49 correspond to the steps S11 to S19, and the steps S21 to S29, respectively.

According to the present embodiment, since the functions of the authentication server and the policy server can be replaced with the functions that is equipped to the exchanger, it is possible to obtain advantages such as cost reduction of the devices, simplification of the operation, and reduction in labor cost in accordance to this.

Since a provider to offer the wireless LAN access generally has an authentication server for offering the wireless LAN service, it is possible to effectively create a system without newly constructing a policy server by adding a function of treating the QoS information of the wireless LAN and transmitting the terminal user information to the policy server to the above authentication server.

Figure 12:
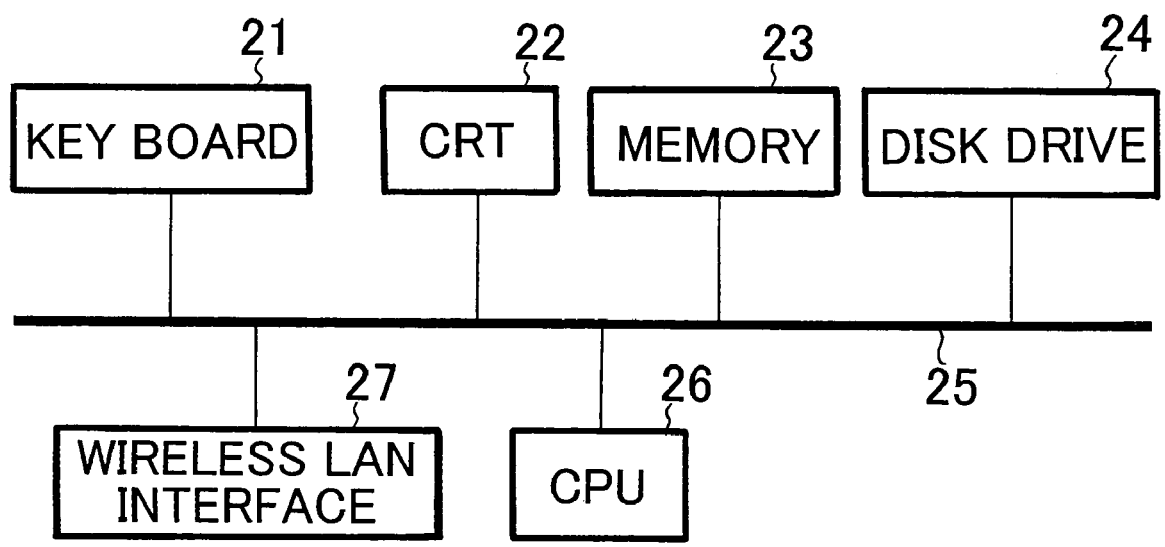
FIG. 12 is a block diagram showing a case that the wireless LAN access point and the wireless LAN terminal are constructed by a computer.

One or both of the above-described wireless LAN access point (base station) and the wireless LAN terminal can be constructed by a computer as shown in FIG. 12. A CPU 26 carries out the process on the basis of a program in which a flow shown in FIG. 8, FIG. 9, FIG. 10 or FIG. 11 (in this case, the program is saved in a disk drive 24). A key board 21 is an input means for inputting the data such as the authentication information or the like and a CRT 22 is a display means for indicating advisability of the QoS service. A reference numeral 25 denotes a bus such as a data bus or the like, and a reference numeral 27 denotes a wireless LAN I/F (or LAN I/F). The data that is inputted from the key board or the like is stored in a storage means, for example, a memory 23 such as a DRAM or the like and a disk drive 24 such as a MO and a hard disk or the like.

As described above, according to the present invention, the QoS control through the wireless LAN has an advantage such that, when a user operating a terminal that is connected to a wireless LAN logs onto a certificate server, it is possible to offer the QoS service that has been determined in advance for each user to a wireless LAN packet of the terminal, and thereby, even when the terminal to be used is changed, if the same user logs onto the certificate server by using the same authentication information, the same QoS service can be offered consistently.

What is claimed is:

1. A QoS control system using a wireless LAN network, comprising:

a wireless LAN base station connected to the wireless LAN network; and one or a plurality of wireless LAN terminals connected to the wireless LAN base station via the wireless LAN network, wherein said wireless LAN base station comprises means for receiving information for identifying the wireless LAN terminal and a QoS service content of a user whose authentication is required from a server via a communication network, the server being configured to, when the user of the wireless LAN network requires a user's authentication from the wireless LAN terminal, authenticate the user of the wireless LAN network whose authentication is required based on a recorded user's authentication information and notify the wireless LAN base station of the information and the QoS service content, the QoS service content including a priority information, means for receiving information for identifying the wireless LAN terminal from the wireless LAN terminal via the wireless LAN network, and means for carrying out priority control in accordance with the priority information of the QoS service content from the server, if the information for identifying the wireless LAN terminal from the wireless LAN terminal corresponds to that from the server, and wherein said wireless LAN terminal comprises means for requiring the user's authentication the wireless LAN base station, means for receiving the priority information of the QoS service content notified from the server via the wireless LAN base station, and means for carrying out the priority control in accordance with the priority information, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

2. The QoS control system according to claim 1 wherein said authentication server or the policy server is included in an exchanger to accommodate VoIP (Voice over Internet Protocol).

3. A wireless LAN base station for communicating with a one or a plurality of wireless LAN terminals via a wireless LAN network, said wireless LAN base station comprising:

means for receiving information for identifying the wireless LAN terminal and a QoS service content of a user whose authentication is required from a server via a communication network, the server being configured to, when the user of the wireless LAN network requires a user's authentication from the wireless LAN terminal, authenticate the user of the wireless LAN network whose authentication is required based on recorded user authentication information and notify the wireless LAN base station of the information and the QoS service content, the QoS service content including a priority information;

means for receiving information for identifying the wireless LAN terminal from the wireless LAN terminal via the wireless LAN network; and means for carrying out priority control in accordance with the priority information of the QoS service content from the server, if the information for identifying the wireless LAN terminal from the wireless LAN terminal corresponds to that from the server, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

4. A wireless LAN terminal for communicating with a wireless LAN base station via a wireless LAN network, the wireless LAN base station comprising:

means for requiring a user's authentication to the wireless LAN base station, wherein the wireless LAN base station receives information for identifying the wireless LAN terminal and a QoS service content of a user whose authentication is required from a server via a communication network, the server is configured to authenticate the user of the wireless LAN network whose authentication is required based on a recorded user's authentication information and notify the wireless LAN base station of the information and the QoS service content, and the QoS service content includes a priority information;

means for receiving the priority information of the QoS service content notified from the server via the wireless LAN base station; and means for carrying out the priority control in accordance with the priority information, if the information for identifying the wireless LAN terminal from the server is correct, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

5. A QoS control method of a wireless LAN network including a wireless LAN base station and one or a plurality of wireless LAN terminals to be connected to the wireless LAN base station, said method comprising the steps of:

performing a first step by a server connected to the wireless LAN base station via the wireless LAN network, comprising the steps of authenticating a user of the wireless LAN network whose authentication is required based on a recorded user's authentication information, when the user of the wireless LAN network requires a user's authentication from the wireless LAN terminal, and notifying the wireless LAN base station of information for identifying the wireless LAN terminal and a QoS service content of a user whose authentication is required from a server via a communication network, the QoS service content including a priority information;

performing a second step by the wireless LAN base station comprising the steps of receiving the information for identifying the wireless LAN terminal and the QoS service content of a user whose authentication is required from the server via the communication network, receiving information for identifying the wireless LAN terminal from the wireless LAN terminal via the wireless LAN network, and carrying out priority control in accordance with the priority information of the QoS service content from the server, if the information for identifying the wireless LAN terminal from the wireless LAN terminal corresponds to that from the server; and performing a third step by the wireless LAN terminal comprising the steps of requiring a user's authentication the wireless LAN base station, receiving the priority information of the QoS service content notified from the server via the wireless LAN base station, and carrying out the priority control in accordance with the priority information, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

6. A QoS control program for enabling a computer of wireless LAN base station to execute a QoS control method of a wireless LAN network, said wireless LAN network including the wireless LAN base station and one or a plurality of wireless LAN terminals to be connected to the wireless LAN base station, said QoS control method comprising the steps of:

receiving authentication request from the wireless LAN terminal;

adding the received authentication request to information with respect to the wireless LAN base station;

transmitting the added authentication request to a server, wherein the server is connected to the wireless LAN base station via the wireless LAN network, the server is configured to authenticate a user of the wireless LAN network whose authentication is required based on a recorded user's authentication information and to notify the wireless LAN base station of information for identifying the wireless LAN terminal and a QoS service content of a user whose authentication is required from a server via a communication network, and the QoS service content includes a priority information;

if the server does not authenticate the user whose authentication is requested, transmitting the information indicating that the server fails to authenticate the user, to the wireless LAN terminal; and if the server authenticates the user whose authentication is requested, carrying out priority control with respect to the wireless LAN terminal defined by the information for identifying the wireless LAN terminal from the server in accordance with the priority information of the QoS service from the server, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

7. A QoS control program for enabling a computer of wireless LAN terminal to execute a QoS control method of a wireless LAN network, said wireless LAN network including a wireless LAN base station and the wireless LAN terminal to be connected to the wireless LAN base station, said QoS control method comprising the steps of:

requiring a user's authentication to the wireless LAN base station, wherein the wireless LAN base station receives information for identifying the wireless LAN terminal and a QoS service content of a user whose authentication is required from a server via a communication network, the server is configured to authenticate the user of the wireless LAN network whose authentication is required based on a recorded user's authentication information and notify the wireless LAN base station of the information and the QoS service content, and the QoS service content includes a priority information;

receiving the priority information of the QoS service content notified from the server via the wireless LAN base station; and carrying out the priority control in accordance with the priority information, if the server authenticates the user whose authentication is requested, and wherein said server comprises:

an authentication server which stores the authentication information for each user of the wireless LAN network and notifies the information for identifying the wireless LAN terminal and a user information of the user, when the user of the wireless LAN network carries out authentication request from the wireless LAN terminal via the wireless LAN base station, and a policy server which stores QoS service content for each user and notifies the wireless LAN base station of QoS service content corresponding to the user information notified from the authentication server together with the information for identifying the wireless LAN terminal.

\* \* \* \* \*